United States Patent
Rapinat et al.

(10) Patent No.: US 9,609,267 B2
(45) Date of Patent: Mar. 28, 2017

(54) METHODS AND DEVICES FOR GENERATING AND USING VIDEO IMAGES COMPRISING CONTROL MESSAGES

(75) Inventors: Anne Rapinat, Chatillon (FR); Nicolas Perraud, Issy les Moulineaux (FR); Franck Desaulty, Paris (FR); Alexandre Fromion, Antony (FR)

(73) Assignee: Peugeot Citroën Automobiles SA, Velizy Villacoublay (FR)

( * ) Notice: Subject to any disclaimer, the term of this patent is extended or adjusted under 35 U.S.C. 154(b) by 1076 days.

(21) Appl. No.: 13/634,834

(22) PCT Filed: Feb. 22, 2011

(86) PCT No.: PCT/FR2011/050370
§ 371 (c)(1),
(2), (4) Date: Sep. 13, 2012

(87) PCT Pub. No.: WO2011/117496
PCT Pub. Date: Sep. 29, 2011

(65) Prior Publication Data
US 2013/0014198 A1    Jan. 10, 2013

(30) Foreign Application Priority Data
Mar. 22, 2010 (FR) ..................... 10 52051

(51) Int. Cl.
*H04N 21/235* (2011.01)
*H04N 7/025* (2006.01)
(Continued)

(52) U.S. Cl.
CPC .............. *H04N 7/025* (2013.01); *B60R 1/00* (2013.01); *G06T 1/0085* (2013.01); *H04N 7/18* (2013.01);
(Continued)

(58) Field of Classification Search
CPC ....... G06T 15/405; G06T 15/04; G06F 3/017; H04L 67/10; H04L 67/12; H04L 67/42;
(Continued)

(56) References Cited

U.S. PATENT DOCUMENTS 7,518,614 B2 * 4/2009 Emerson et al. ............. 345/502
8,270,807 B2 * 9/2012 Sasaki .................. G11B 27/105
386/246

(Continued)

FOREIGN PATENT DOCUMENTS

| EP | 0901282 A2 | 3/1999 |
|---|---|---|
| GB | 2455420 A | 6/2009 |
| WO | 2004021275 A2 | 3/2004 |

OTHER PUBLICATIONS

International Search Report from corresponding International Application No. PCT/FR2011/050370 mailed Apr. 28, 2011.

*Primary Examiner* — Dave Czekaj
*Assistant Examiner* — Kehinde O Abimbola
(74) *Attorney, Agent, or Firm* — Polster, Lieder, Woodruff & Lucchesi, LC

(57) ABSTRACT

A device (D1) is dedicated to the processing of video images which are intended to be transmitted to a receiver (R) so as to be used to construct synthesis images to be displayed. This device (D1) is devised, in the presence of a video image acquired consisting of video image data, so as to construct a processed image by replacing in this acquired video image some of its video image data by a control message which contains at least one group of control data, of nonvideo type and defining information which is intended to be used by the receiver (R) to construct a synthesis image to be displayed on the basis at least of the remaining video image data, after the replacement, in the processed image.

16 Claims, 1 Drawing Sheet

(51) Int. Cl.
*B60R 1/00* (2006.01)
*G06T 1/00* (2006.01)
*H04N 7/18* (2006.01)
*H04N 19/89* (2014.01)

(52) U.S. Cl.
CPC ............. *H04N 7/183* (2013.01); *H04N 19/89* (2014.11); *B60R 2300/802* (2013.01)

(58) Field of Classification Search
CPC ..... H04L 67/18; H04L 51/08; H04L 12/1827; H04L 51/10; H04L 12/1813; H04L 12/28; H04L 12/282; H04L 1/00; H04L 43/0817; H04L 43/10; H04L 67/28; H04L 67/2842; H04L 1/0026; H04L 1/0027; H04L 12/1407; H04N 19/176; H04N 19/30; G08C 15/00

See application file for complete search history.

(56) References Cited

U.S. PATENT DOCUMENTS

| | | | | |
|---|---|---|---|---|
| 8,287,386 B2* | 10/2012 | Miller | ........................ | A63F 1/02 235/375 |
| 8,419,535 B2* | 4/2013 | Miller | ........................ | A63F 1/12 463/16 |
| 8,545,328 B2* | 10/2013 | Miller | ........................ | A63F 1/18 273/138.1 |
| 8,613,671 B2* | 12/2013 | Miller | ........................ | A63F 1/02 463/39 |
| 8,771,078 B2* | 7/2014 | Miller | ........................ | A63F 1/18 463/13 |
| 8,784,189 B2* | 7/2014 | Miller | ........................ | A63F 1/02 463/16 |
| 2001/0052911 A1* | 12/2001 | Boyle | ................... | G06F 3/0481 715/763 |
| 2002/0097436 A1* | 7/2002 | Yokoyama et al. | ............ | 358/2.1 |
| 2003/0002060 A1* | 1/2003 | Yokoyama et al. | ............ | 358/1.9 |
| 2005/0286740 A1 | 12/2005 | Sigle | | |
| 2006/0039465 A1* | 2/2006 | Emerson et al. | ......... | 375/240.01 |
| 2006/0039466 A1* | 2/2006 | Emerson et al. | ......... | 375/240.01 |
| 2006/0039468 A1* | 2/2006 | Emerson et al. | ......... | 375/240.01 |
| 2007/0160048 A1* | 7/2007 | Faucheux et al. | ............ | 370/390 |
| 2008/0036757 A1* | 2/2008 | Furukawa et al. | ............ | 345/418 |
| 2010/0311488 A1* | 12/2010 | Miller | ........................ | A63F 1/12 463/16 |
| 2010/0311489 A1* | 12/2010 | Miller | ........................ | A63F 1/12 463/16 |
| 2010/0311490 A1* | 12/2010 | Miller | ........................ | A63F 1/18 463/16 |
| 2010/0311493 A1* | 12/2010 | Miller | ................... | A63F 3/00643 463/22 |
| 2010/0311494 A1* | 12/2010 | Miller | ........................ | A63F 1/18 463/22 |
| 2010/0311502 A1* | 12/2010 | Miller | ................... | G07F 17/3293 463/30 |
| 2010/0312625 A1* | 12/2010 | Miller | ........................ | A63F 1/02 705/14.5 |
| 2011/0013890 A1* | 1/2011 | Sasaki | ................... | G11B 27/105 386/357 |

* cited by examiner

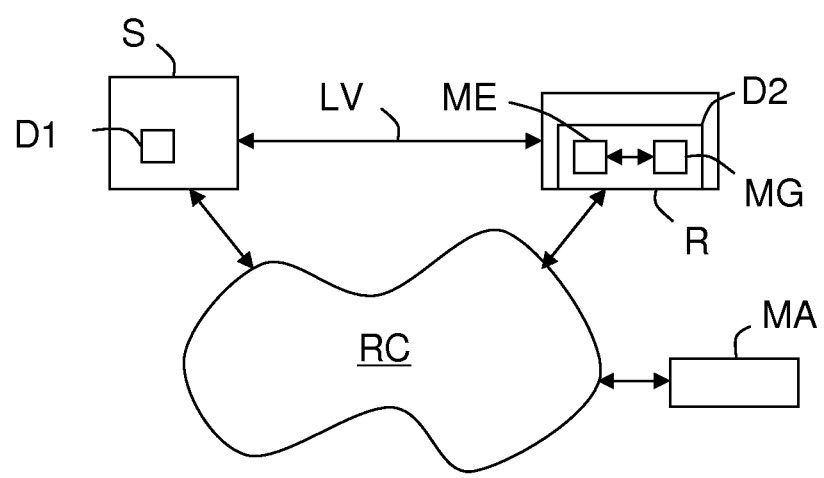

METHODS AND DEVICES FOR GENERATING AND USING VIDEO IMAGES COMPRISING CONTROL MESSAGES

CROSS-REFERENCE TO RELATED APPLICATIONS

This application is the US. National Stage, under 35 U.S.C. §371 of International App. No. PCT/FR2011/050370 which was filed on Feb. 22, 2011 and claims priority to French App. No. 1052051 filed Mar. 22, 2010.

BACKGROUND

The invention relates to video images, and more precisely the generation of video images at a source and the use of video images at a receiver.

Here "source" means electronic or computer equipment suitable for supplying video images intended to be used by a receiving device (or receiver). It should be noted that it is also possible for such equipment to acquire video images. Consequently, it could involve for instance an electronic data transmission box or a video camera suitable for acquiring video images, for instance, of the environment of a vehicle, such as an automobile.

Moreover, here "receiver" means electronic or computer equipment suitable for receiving video images transmitted by at least one source and for using these received video images, and any auxiliary data (e.g., functional data), in order to produce graphics to be displayed. Consequently, it could involve for instance a driver assist system installed in a vehicle, such as an automobile.

A person skilled in the art knows that in certain systems, such as in certain vehicles, such as an automobiles, the receiver is connected on one side to a communication network, in general a multiplexed type of network, which supplies the receiver with auxiliary data (for instance functional data, such as the vehicle speed, indicators for the lights used or indicators for breakdown or dysfunctions), and, on the other side to at least one digital video line (or link) (for instance, LVDS type ("Low Voltage Differential Signaling") or CML type ("Current Mode Logic")), which is connected to a source of video images. In this case, the receiver uses the video image data and the auxiliary data to form graphics which are intended to be displayed in real time.

This mode of forming graphics works very well, as long as the auxiliary data does not require synchronization with some of the video image data. But, when this synchronization is necessary, the aforementioned method cannot work correctly since the multiplexed network and the video connection are not synchronized.

Therefore, the goal of the invention is to remedy at least partially the aforementioned disadvantage.

BRIEF SUMMARY

To this end, a first method is proposed for processing video images intended to be transmitted to a receiver in order to be used for forming graphics to be displayed.

This first method comprises forming a processed image by replacing, in an acquired video image, some of the video image data constituting the acquired video image with a control message containing at least a group of control data of a non-video type and which defines information intended to be used by the receiver for forming graphics to be displayed, starting from at least the video image data remaining after replacement in the processed image.

The first method can comprise other characteristics which can be taken separately or in combination, and specifically:

- in the presence of an acquired video image formed of video image data arranged in the form of N lines, at least a part of the $n^{th}$ line (with $1 \leq n \leq N$) can be replaced by the control message;
- in a first variant, in the presence of an acquired video image formed of video image data arranged in the form of N lines, at least a part of the $0^{th}$ line or $N+1^{th}$ line can be added to this image to constitute the control message;
- in a second variant, in the presence of an acquired video image formed of video image data arranged in the form of M columns, at least a part of the $m^{th}$ column (with $1 \leq m \leq N$) can be replaced by said control message;
- in a third variant, in the presence of an acquired video image formed of video image data arranged in the form of M columns, at least a part of the 0th column or M+1th column can be added to this image for forming the control message;
- in the case of replacement of video image data in at least a part of the $n^{th}$ line or the $m^{th}$ column, in reception the replaced data can be replaced by a gray level;
- in a first variant, video image data in at least a part of the $n^{th}$ line or the $m^{th}$ column can be replaced by data of a control message, whereby the values of this data define gray levels, and in reception the gray level of the control message data can be used to restore the color of the video image data that was replaced by the control message data.
- in a second variant, in the presence of video image data each defined by a group of P bits for the red color, a group of P bits for the green color and a group of P bits for the blue color, K bits can be replaced in each group of video image data of the $n^{th}$ line or of the $m^{th}$ column by K bits with values defining data of a control message, and in reception the not replaced P-K bits of each of the three groups of control message data can be used to restore the color of the video image data that was replaced by the control message data;
- each control message data can be integrated in a redundant manner at least two times in a video image;
- the control message data can also comprise a counter value representing the position of the acquired video image inside one sequence (of video images);
- the control message data can also comprise an error correction code representing the remaining video image data in the processed image;
- the error correction code can be a CRC type code.

A first device is also proposed which is dedicated to the processing of video images intended to be transmitted to a receiver in order to be used for forming graphics to be displayed.

This first device arranges data of an acquired video image formed of video image data to form a processed image by replacing some of the video image data of this acquired video image with a control message which contains at least one group of control data of a non-video type and which defines information intended to be used by the receiver to form graphics to be displayed starting at least from the video image data that remains after the replacement in the processed image.

Equipment is also proposed which comprises a source suitable for transmitting video images to a receiver, and which further comprises a first (processing) device of the above-presented type which is intended to supply the source with processed images that must be transmitted to the receiver.

A second method is also proposed which is dedicated to the generation of graphics that must be displayed by a receiver, and in case of reception of an image processed by means of a first (processing) method of the type presented above, comprising extracting from this processed image the control data contained in its control message, then forming graphics to be displayed, starting from at least the video image data that remains in the received processed image and as a function of the extracted control data.

The second method according can comprise other characteristics which can be taken separately or in combination, and specifically:

the graphics to be displayed can be formed starting from video image data that remains in the received processed image and auxiliary data, and as a function of the extracted control data at least some which are related to the auxiliary data;

after having extracted the control data, an error correction code can be calculated representing video image data remaining in the received processed image; and this remaining video image data can be used when the calculated error correction code is identical to the one defined by some of the extracted control data.

A second device is proposed which is dedicated to the generation of graphics to be displayed by a receiver, and arranged, upon receipt by the receiver of an image processed by means of a first (processing) method of the type described above, to extract from this processed image the control data contained in its control message, and then to form graphics to be displayed starting from at least the video image data remaining in the received processed image and as a function of the extracted control data.

Equipment (or a receiver) is proposed which is suitable for receiving processed images from a source and comprising a second (generating) device of the type described above.

The methods and devices are well suited, although not in limiting manner, for managing the generation and use of video images by a source and by a receiver, respectively, that is part of a vehicle, which can be an automotive type vehicle.

BRIEF DESCRIPTION OF THE DRAWING

Other characteristics and advantages of the methods and devices will become clear by examining the following detailed description, and the attached drawing, in which the unique FIGURE schematically and functionally illustrates a network to which are connected a source equipped with a first processing device according to the invention, and a receiver equipped with an example of a second generating device according to the invention and connected to the source by a video connection.

The attached drawing serves not only to complete the invention, but also contributes to its definition, in case of need.

DETAILED DESCRIPTION

The goal of the invention is to offer a first and second method, and associated first and second devices, for the transmission of video images between a source S and a receiver R, via a digital video connection LV, as well as if necessary the use by the receiver R of auxiliary data coming from a network RC, which can be a communication network.

In the following, it is assumed, as non-limiting example, that the source S and the receiver R are part of a vehicle, which can be an automotive type vehicle. For instance, the source S can be a camera used to acquire video images of one part of the vehicle environment, and the receiver R can be a driver assist system (or device) suitable for generating graphics resulting from the integration in the images of the parts at least of the video images supplied by the source S or the addition of auxiliary data in parts at least of the video images supplied by the source S. But, the invention is not limited to this application. It concerns in fact any type of electronic or computer equipment, if necessary, adapted to (tele)communications, and comprising a source of video images or a receiver receiving video images supplied by at least one nearby or remote source, to which it is connected via a digital video connection LV. The source can be for instance a computer communication box or a multimedia box or a radio and audio box.

It is to be noted that the receiver R can be installed, for instance, in a device of the vehicle such as the on-board computer or a handset or a multifunctional screen. But it can also be external to this equipment.

In the following it is assumed, as non-limiting example, that the digital video connection LV connecting the source S with the receiving equipment R is of the LVDS type (Low Voltage Differential Signaling) or CML type (Current Mode Logic). But, the invention is not limited to this type of digital video connection. It relates in fact to any type of digital video connection for transmission of files defining video images.

Finally, it is assumed in the following, as non-limiting example, that the network RC, to which the source S and the receiver R are connected, is an on-board multiplexed network of a vehicle. But, the invention is not limited to this type of network. In fact it also, and in particular, relates to video/multimedia networks, for instance MOST or e-MOST type and Ethernet or USB type networks.

First and second methods are proposed which are intended to be implemented at the source S and receiver R, respectively.

The first method is implemented each time the source S must transmit an acquired video image to the receiver R.

It is to be noted that the video image can be acquired by the source S or by another acquisition device.

This first method can be implemented by means of first processing device D1.

It is to be noted that in the unique FIGURE, the first (processing) device D1 is part of the source S. But, this is not mandatory. In fact, the device D1 could comprise a device or an element connected to the source S in order to be able to communicate with the source S. Consequently, the first device D1 can be implemented in the form of software (or computer) modules, or electronic circuits, or a combination of electronic circuits and software modules.

The first (processing) method comprises forming a processed image starting from an acquired video image present in the source S. This processing (performed by the first device D1) comprises replacing in an acquired video image some of the (digital) video image data forming the processed image with a control message which contains at least a group of control data. The control data are non-video type data and define information which is intended to be used by the receiver R in order to form graphics to be displayed, starting from at least video image data that remains after the replacement, in the processed image.

Any type of control data useful at the receiver R for forming graphics can be part of a control message. The control data can define for instance the functional state of a camera, the ambient light, the rheostat status, the diagnostic data, characteristics of the transmitted processed video image (typology, mode (image configuration), theme (form(s) of graphics object(s)), environment (graphics palette used), graphics object(s) arrangement, useful image zone (zone not to be covered, specific zone), an electronic signature of the processed video image, or auxiliary information allowing for a specific synchronized use of auxiliary data at the receiver R in order to form a graphics (such as object or text positions, or the designation of specific filtering to be applied (such as a selected graphics effect), or the definition of a life phase (turning on/off)).

When the acquired video image is a file formed of (digital) video image data arranged in the form of N lines of M columns of pixels, the first device D1 can, for instance, replace at least a part of the first line (or upper line) or of the $n^{th}$ (and therefore last) line (or lower line) or more in general of the $n^{th}$ line (with $1 \leq n \leq N$) by a control message. In other words, the processed image then comprises at least N-1 lines of video image data and at the most one line of control data. There is therefore a slight loss of video information, but it is understood that this is not damaging when it involves the (upper or lower) edge of an image. In a variant, it is also possible to replace a portion at least of the $m^{th}$ column (with $1 \leq m \leq M$) with a control message. Note that this also introduces loss of video information.

It is recalled that a video image can be characterized by resolution (N number of lines and M number of columns) and by "color depth" (number of bits defining each image pixel).

But, in order not to degrade the video image, it is also possible to add to the acquired video image a part at least of the $0^{th}$ line or of the $N+1^{th}$ line. It is understood that the $0^{th}$ line is the line which is added before the first useful line (n=1) of an image, and therefore which is not used when displayed, and that the $N+1^{th}$ line is a line which is added after the last useful line (n=N) of an image, and therefore which is not used when displayed. In a variant, it is also possible to add to an acquired video image a part at least of the $0^{th}$ column or of the $M+1^{th}$ column which is also not used when displayed. Obviously, this requires the receiver R to be informed of this addition.

Note that the control message also can advantageously comprise a value V(t) of a counter representing the position of the acquired video image inside a sequence of video images and which is incremented by one unit by the first device D1 or the source S after each transmission of a processed image of one sequence.

This counter value is intended to signal to the receiver R the sequence number of a processed image so that the receiver can properly use this image if it is received in whole (or valid) manner.

It should also be noted that the control message can also advantageously comprise an error correction code representing video image data remaining in a processed image (after replacement by the control message). This error correction code can be, for instance, a CRC type code ("Cyclic Redundancy Check" (or "checksum")). It serves to determine at the receiver R whether the video data of a received processed video image comprises errors and therefore whether this processed video image is whole or not.

Once a video image has been processed by a first device D1, the image can be transmitted by the source S to the receiver R (destination) via the digital video connection LV.

The second method according to the invention is carried out each time the receiver S receives a video image processed by the first device D1 of the source S, via the digital video connection LV.

This second method is carried out by means of a second generating device D2.

Note that in the unique FIGURE, the second (generating) device D2 is part of the receiver R. But, this is not mandatory. In fact, the second device D2 could be a device or element connected to receiver R in order to be able to communicate with the latter. Consequently, the second (generating) device D2 can be implemented in the form of software (or computer) modules, or electronic circuits, or a combination of electronic circuits and software modules.

The second (generating) method comprises extracting from each processed image received by receiver R the control data contained in its control message, then in forming graphics to be displayed starting at least from video image data remaining in the received processed image and as a function of extracted control data.

For instance, and as illustrated in a non-limiting manner in the unique FIGURE, the second device D2 can comprise, on the one hand, an extraction module ME suitable for extracting the control message and the remaining video image data from the file constituting a received processed image, and, on the other hand, a generating module MG coupled to the extraction module ME and suitable for generating (or forming) the graphics as indicated above.

Note that when the extracted control message comprises a counter value V(t), the extraction module ME can store this value in a memory (which could be a software type memory). When a processed image is received and the extraction module has extracted the value V(t) of its control message, it can increment by one unit the value V(t') (t'<t) of the previously received processed image (stored in memory) in order to obtain the auxiliary value VA which it compares with the extracted V(t) value. It is clear that if V(t)=VA then there was no loss of image since the receipt of the preceding image, and therefore that the last received processed image can be used in continuity with the preceding image; conversely, if V(t)≠VA then there was loss of image since the reception of the preceding image, and therefore that the last received processed image a priori cannot be used in continuity with the preceding image.

Note also that when the extracted control message comprises an error correction code (CRC), the extraction module ME can use this code in order to verify the integrity of the remaining video image data associated with it. More precisely, the extraction module ME can compare, for example, the error correction code (CRC) which is contained in the control message, with an error correction code (CRC) which it determines starting from the remaining video image data accompanying this control message. It is understood then that the last received processed image is considered whole (or valid) when its error correction code (CRC) is identical to the code determined by the extraction module ME; conversely, the last received processed image is considered not whole (or not valid) when its error correction code (CRC) is different than the code determined by the extraction module ME.

If a received processed image is considered whole (or valid) and there was no loss of image since the reception of the preceding image, then the generating module MG can use its remaining video image data and its control data to form graphics.

Note that when the auxiliary data received by the receiver via the network RC must be used in a synchronized manner with the remaining video image data of a received processed image, then the generating module MG makes use of the control data which is contained in the control message of this received processed image and which concerns the received auxiliary data for forming its graphics. In other words, the generating module MG forms graphics to be displayed starting from video image data remaining in the received processed image and auxiliary data and as a function of the extracted control data.

Any type of auxiliary data can be used here for completing the remaining video image data of a processed video image. For instance, it could involve functional data relative (here) to the vehicle, such as the vehicle speed, the indicators of the lights used, indicators of breakdown or dysfunction or of the life phase of the vehicle (such as for instance turning on or off), or codes designating a filtering to be applied (such as for instance a graphics effect or a graphics environment) or a type of cutout to be applied (position, size, form).

Note also that any technique known to a person skilled in the art can be used to form the graphics starting from the aforementioned data. In fact, no technique is preferred here. A person skilled in the art will understand that once he possesses control data relative to the use of video image data and auxiliary data, he is then able to use this control data for forming graphics starting from this video image data and auxiliary data.

Note also that when the extracted control message has replaced video image data (or pixels) contained in a part at least of the $n^{th}$ line or of the $m^{th}$ column (and therefore in an image zone to be displayed), the second device D2 can automatically replace each missing pixel by a gray level which is predefined or selected as a function of nearby (not replaced) pixels. This limits the visual impact induced by a missing pixel on a displayed image. Indeed, a black or dark gray color pixel is in general less visible in an environment than a light (white) pixel when it is missing.

In a variant, the first device D1 can, for instance, use bits, the values of which define gray levels, to code the control data of a control message. In this case, in reception, the second device D2 can use, as such, the bits of the control data for generating pixels of an image to be displayed. Of course, these pixels (coming from the control data) will be displayed in gray levels.

In another variant, when the image pixels are coded, for instance, in RGB (red-green-blue), in other words in a group of P bits for red, a group of P bits for green and a group of P bits for blue, the first device D1 can choose, for example, to replace only some of the bits of each group of one pixel by bits defining one piece of control data of a control message. For instance, the decision can be made to dedicate K bits of each group (by preference always the same) to one piece of control data of a control message. For instance, if P is equal to 6, K can be between 2 and 4. These K bits are by preference selected from among the least significant bits (LSB) of a group. But, in a variant the K bits can be selected from among the most significant bits (MSB) of a group. It is clear that P-K bits of each group then can assume any value to code one of the three color parameters (R, G or B) of the pixel considered, and the K bits remaining of each group can then assume any value in order to code one piece of control data of a control message. In this case, in reception, the second device D2 can use the P-K bits of each group of a pixel, which has been the object of a "replacement", to reconstitute its color inside its image and the complementary K bits as control data. This is particularly advantageous because it allows for the display of the pixel with a color which is certainly degraded, but nevertheless very close to its original color (prior to replacement). Furthermore, this limits the risks inherent to data transmission errors. In fact, the coding of control data is, in this case, somewhat "distributed" over the three color parameters (R, G or B) of certain pixels, which increases what a person skilled in the art calls the Hamming distance.

In order to further limit the risks inherent to data transmission errors, it is also possible to introduce redundancy of control data (whether they are coded in gray level or in RGB). More precisely, the same piece of control data of a control message can be coded, for example, at least two times inside the same image, but by preference on different pixels. For instance, the same piece of control data of a control message can be coded in a redundant manner on the four "corner" pixels of a video image file (namely the pixel of the first column and the first line, the pixel of the last column and first line, the pixel of the first column and last line, and the pixel of the last column and last line). This allows for further increasing the Hamming distance and therefore further reducing the risks of transmission errors.

Note also that once the second device D2 has generated a graphic, the image is ready to be displayed by display means MA, such as, for example, a screen integrated in the dashboard of the vehicle.

For instance, and as illustrated in a non-limiting manner in the unique FIGURE, the display means MA is connected to the network RC of the vehicle, and therefore is external to the receiver R. Consequently, the digital data files constituting the graphics generated by the second device D2 are transmitted from the receiver R to the display means MA via the network RC. But, this is not mandatory. In fact, the display means MA could be connected directly to receiver R (or the device containing it, for example the on-board computer)), or it could be part of the receiver R.

1. The invention as set forth in the claims is not limited to the embodiments of the treatment process, device processing, source equipment, process generation, generation device and receiving equipment described above, which is only set forth as an example; rather, it encompasses all the variants that can be envisioned by a person skilled in the art within the scope of the following claims.

The invention claimed is:

1. A method for processing video images intended to be transmitted to a receiver in order to be used for forming graphics to be displayed, the method comprising:

acquiring digital video image data from a sensor;

electronically processing said acquired video image data by either (1) replacing some of the video image data with a control message, or (2) adding a control message to the video image data; the control message containing at least a group of control data of a non-video type and which defines information intended to be used by said receiver to form graphics to be displayed starting from at least the remaining video image data after said replacement, in said processed image;

transmitting said processed image data to a receiver;

extracting the control data from the processed image data;

forming an image from the video image data in the processed image data as a function of the extracted control data;

displaying said image formed from the video image data on a display;

the acquired video image being formed of video image data arranged in the form of N lines or M columns;
  (a) wherein if the video image data is arranged in the form of N lines,
    (1) the method comprises replacing at least a part of the $n^{th}$ line (with 1 n≤N) of the video image data with said control message; and wherein, the step of forming an image further includes replacing each pixel of missing video image data, or
    (2) the method comprises adding to at least a part of a 0th or the $N_+$1th line to said video image data to form said control message; and
  (b) wherein if the video image data is arranged in the form of M columns:
    (1) the method comprises replacing at least a part of the $m^{th}$ column (with 1≤m≤M) of the video image data with said control message; and wherein, the step of forming an image further includes replacing each pixel of missing video image data; or
    (2) the method comprises adding at least a part of a 0th or M+1th column to said video image data to form said control message.

2. The method according to claim 1, wherein, in reception each replaced piece of video image data is replaced by a gray level which either is predefined or is selected as a function of nearby pixels of video image data which were not replaced by control message data.

3. The method according to claim 1, wherein video image data is replaced by data of a control message the value of which defines gray levels, and in reception the gray level of the control message data is used to reconstitute the color of the video image data that this piece of data had replaced.

4. The method according to claim 1, wherein the video image data is defined by a group of P bits for the color red, a group of P bits for the color green and a group of P bits for the color blue, the method comprising replacing K bits in each group of one piece of video image data with K bits the values of which define data of a control message, and in reception the not replaced P-K bits of each of the three groups of one control message data are used to reconstitute the color of the video image data that the control message data replaced.

5. The method according to claim 1, wherein the control message data is integrated in redundant manner at least twice in a video image.

6. The method according to claim 1, wherein said control message further comprises a counter value representing the position of said acquired video image inside a sequence.

7. The method according to claim 1, wherein said control message further comprises an error correction code representing said video image data remaining in said processed image.

8. The method according to claim 7, wherein said error correction code is a CRC type code.

9. A device for processing and displaying video images; the device comprising:
  means for acquiring video image data comprising a video image from a sensor, the video image data being arranged in the form of N lines or M columns;
  a processor adapted to either (1) replace some of the acquired video image data with a control message, or (2) add a control message to the acquired video image data;
    a) wherein if the video image data is arranged in the form of N lines,
      (1) the processor replaces at least a part of the $n^{th}$ line (with 1 n≤N) of the video image data with said control message; or
      (2) the processor adds to at least a part of a 0th or the N+1th line to said video image data to form said control message; and
    (b) wherein if the video image is arranged in the form of M columns;
      (1) the processor replaces at least a part of the $m^{th}$ column (with 1≤m≤M) of said video image data with said control message; or
      (2) the processor adds at least a part of a 0th or M+1th column to said video image data to form said control message;
  the control message containing at least a group of control data of a non-video type and defining information intended to be used by said receiver to form the graphics to be displayed starting from at least the remaining video image data after said replacement, in said processed image;
  a receiver for receiving the processed video image data; the receiver including a processor for extracting the control data from the processed image data and for forming an image from the video image data in the processed image data as a function of the extracted control data; wherein, if the control message replaces at least a part of the $n^{th}$ line or $m^{th}$ column of the video image data, the processor of the receiver further replaces each pixel of missing video image data when forming the image; and
  a display for displaying the image formed by the processor in the receiver.

10. The device of claim 9 further including a source suitable for transmitting video images to the receiver wherein the source receives from the device the processed images that must be transmitted to said receiver.

11. The method according to claim 1, wherein the method includes a step of generating graphics to be displayed by said receiver, wherein, the method comprises extracting from this processed image the control data contained in its said control message, then forming graphics to be displayed starting from at least the video image data remaining in said received processed image and as a function of said extracted control data.

12. The method according to claim 11, wherein said graphics to be displayed is formed starting from said video image data remaining in said received processed image and auxiliary data and as a function of said extracted control data, which for at least some data are relative to said auxiliary data.

13. The method according to claim 11, wherein the method includes calculating a correction code after having extracted said control data, said error correction code representing video image data remaining in said received processed image, and this remaining video image data is used when the calculated error correction code is identical to the one defined by some of said extracted control data.

14. A control device for generating graphics to be displayed by a receiver, said device being adapted to receive processed video image data in which either (1) some of the acquired video image data forming was replaced with a control message, or (2) a control message was added to the acquired video image data; the acquired video image being formed of video image data arranged in the form of N lines or M columns;
  (a) wherein if the video image data is arranged in the form of N lines, (1) the control device replaces at least a part of the $n^{th}$ line (with 1 n≤N) with said control message; and wherein, the control device replaces each pixel of missing video image data when forming the graphics to be displayed, or (2) the control device adds to at least a part of a 0th or the N+1th line to said video image data to form said control message; and (b) wherein if the video image data is arranged in the form of M columns;

(1) the control device replaces at least a part of the $m^{th}$ column (with 1≤m≤M) of the video image data with said control message; and wherein, the control device replaces each pixel of missing video image data when forming the graphics to be displayed; or (2) the control device adds at least a part of a 0th or M+1th column to said video image data to form said control message the control message containing at least a group of control data of a non-video type and which defines information intended to be used by said receiver to form graphics to be displayed starting from at least the remaining video image data after said replacement, in said processed image; said device being adapted to extract the control data contained in the control message from the processed image data, and then to form graphics to be displayed as a function of the control message data starting from at least the video image data remaining in said received processed image as a function of said extracted control data.

15. The device of claim 14 wherein said receiver is adapted for receiving processed images from a source, and wherein said receiver comprises said control device.

16. The method of claim 1 wherein said control data defines one or more of the following: a functional state of a camera, ambient light, rheostat status, diagnostic data, characteristics of the transmitted processed video image (typology, mode (image configuration), theme (form(s) of graphics object(s)), environment (graphics palette used), graphics object(s) arrangement, useful image zone (zone not to be covered, specific zone), an electronic signature of the processed video image, or auxiliary information allowing for a specific synchronized use of auxiliary data at the receiver R in order to form a graphics (such as object or text positions, or the designation of specific filtering to be applied (such as a selected graphics effect), or the definition of a life phase (turning on/off)).

\* \* \* \* \*